3,144,544
WELDING SYSTEM
Israel Kurtz, East Earl, Pa., assignor to Sperry Rand Corporation, New Holland, Pa., a corporation of Delaware
Filed Oct. 29, 1963, Ser. No. 319,910
6 Claims. (Cl. 219—130)

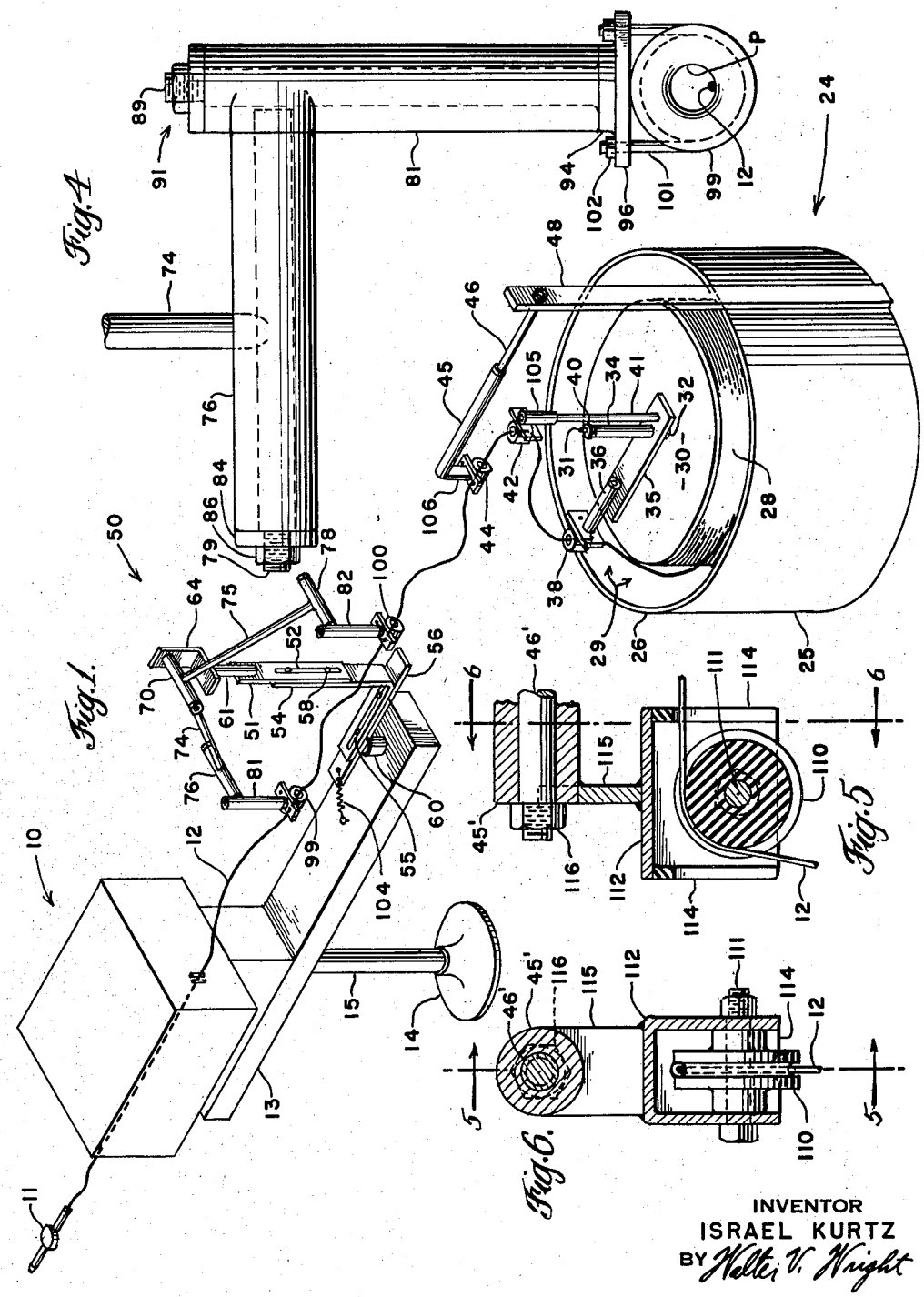

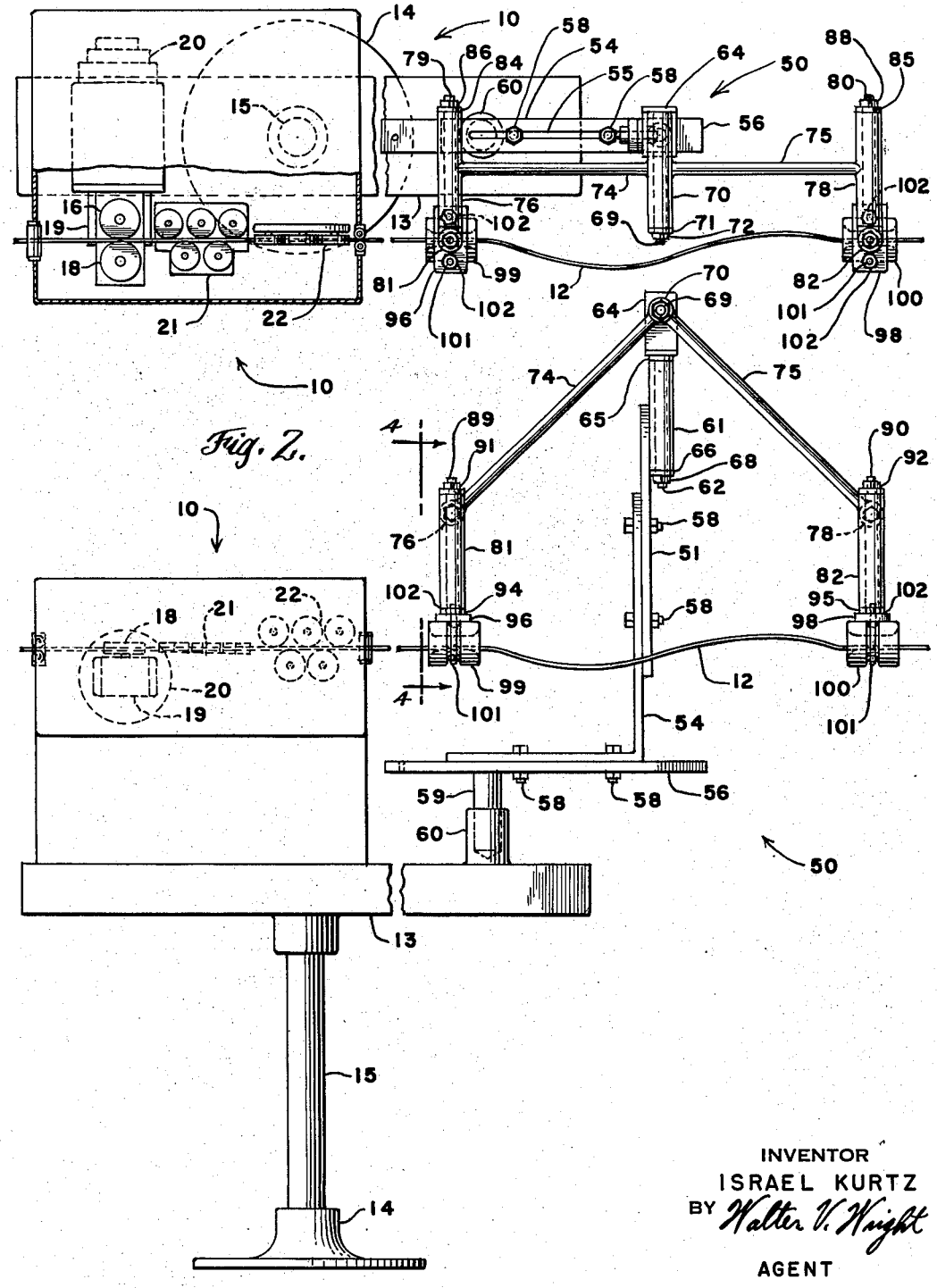

This invention relates to electric welding equipment and operations.

In recent years in electric arc welding machines for use in production lines and other continuous use operations, the conventional welding rod electrode has been largely replaced by an electrode in the form of a long continuous metallic strand, commonly known as welding wire. The relatively long welding wire electrode is fed into the welding gun from a supply spool or the like as a welding operation is performed. Power feed means operated in synchronism with the welding machine advances the wire electrode longitudinally and linearly to and through the welding gun at the same rate at which the electrode is consumed during the welding operation.

The manufacturers of welding electrode wire package the wire in various sizes and types of packages which have proven useful to consumers of wire in general. Some of these general purpose type packages of welding wire are readily useable with welding machines. An example of such a package would be the common spool. A spool of welding wire weighing approximately sixty pounds may contain around four miles of wire. Such spools are commonly journalled right on the welding machine and unwound tangentially by the wire feeding means on the welding machine.

Another type of general purpose wire package in which welding wire is packed by some manufacturers is not readily adaptable for use with welding machines. This is due largely to physical characteristics of welding wire which are different than other types of wire commonly put up in these packages, and due partially to the intermittent type operation of a welding machine which may consume a couple feet of wire between stops as compared to an armature winding machine, for example, which may run miles of wire between stops. The type of wire package referred to here is diagrammatically shown in FIGS. 2 and 3 of U.S. Patent No. 3,000,493 and described in that patent. It comprises a vertical cylindrical container open at the top and having a post-like vertical central core member. Wire packaged therein is pre-formed into flat loops of equal size. Each loop has a diameter approximating half the diameter of the container plus half the diameter of the central core member. The pre-formed loops of wire are stacked flatly in the container one atop another from the bottom of the container to the top. Each loop substantially tangentially contacts the core member at one point and the container perimeter at one point diametrically opposite the point of contact of the loop with the core member, thus loosely and eccentrically encircling the core member. Each loop is circumferentially displaced in the container relative to the immediately underlying loop. The end result is that the space in the container is substantially filled with flat loops of wire lying loosely one atop another. The container is emptied by lifting the loops of wire one loop at a time up over the core member and out the open top of the container starting with the topmost loop and working consecutively downwardly to the bottom-most loop in the container. Such a package, when full, may contain five hundred pounds of welding wire or approximately thirty-six miles of wire. In the interest of simplification and clarity, the use hereafter of the term "container" is intended to mean specifically the type of wire package just described packed with welding wire in the manner just described. It is not intended, however, to be limited specifically to the five hundred pound size. Other amounts of wire such as two hundred fifty pounds are frequently packaged in the same manner in these containers.

It will be readily apparent that a welding machine having a thirty-six mile supply of welding wire will be shut down for wire replacement only one time while a machine using a four mile spool will be shut down nine times for wire replacement. Moreover, savings up to ten cents a pound over the cost of spools of wire may be realized by the purchasing of wire in the above type of five hundred pound containers. However, these advantages are largely offset by difficulties associated with the feeding of the welding wire from these containers.

In feeding wire from these containers, the lifting of each pre-formed flat loop of wire out of the container and the extension of it into a linear running length introduces a twist of three hundred sixty degrees in that length of wire. With soft easily deformable wire, such as armature winding wire, this twist poses no problem. Welding wire, however, has sufficient hardness and stiffness that upon the introduction of the twist, each time a loop is withdrawn from the container, the running length of wire draws up into a spiral in attempting to untwist itself and return to its pre-formed flat loop form. The twist also tensions the wire causing it to behave like a weak coil spring.

Since welding wire is electrically charged during operation of the welding machine, it must be guided to prevent it from touching any grounded conductive material, such as nearby machinery which would short circuit the welding machine. The torsionally tensioned spiral form of the wire, however, will not move easily and uniformly through guides. The spiral compresses behind a guide until the tension ahead of the guide builds up sufficiently to cause the wire to surge through the guide. In the meantime, the wire behind the guide may have drawn up into a loop which will not move through the guide at all. When the spiral wire does move through the guide, it tends to be turned by the guide like a screw or worm gear. Frequently, the surges, backlashes and rotations of the running length of wire travel back down the wire into the container causing the upper-most loops of wire in the container to shift about, move underneath an underlying loop and thereby tangle the wire and stop the feed. When this occurs, it is often impractical to untangle the wire. The remainder of the container is frequently scrapped.

Prior to this invention the only manner in which welding wire could be satisfactorily fed from these containers to a welding machine was to place the container on a special turntable driven in synchronism with the wire feeding means on the welding machine. Each time the feed means lifts a loop of wire out of the container, the turntable rotates the entire container one revolution in the direction opposite to the twist introduced into the wire to remove the twist from the wire. The cost of the turntable and synchronous driving mechanism therefor often prohibits the use of these otherwise desirable large containers of welding wire.

Welding machines used in production line operations are frequently mounted for movement between a plurality of welding stations. All the difficulties associated with feeding welding wire from a supply container located in a fixed position are amplified when the welding machine is moved about; since movement of the machine generally changes both the direction and length of travel of the welding wire from the container to the welding machine.

It is an object of this invention to feed welding wire from a large stationary supply container as described above to a relatively remotely disposed welding machine.

It is another object of this invention to drastically reduce the cost of feeding welding wire from a container of the type described to a welding machine.

It is another object of this invention to eliminate the turntable and synchronous drive therefor on which it was previously considered essential to rest a large welding wire supply container of the type described when feeding welding wire from the container to a welding machine.

It is another object of this invention to feed welding wire from a large fixed supply container of the type described to a welding machine which is swingable between a plurality of welding stations.

It is another object of this invention to feed welding wire from a supply container of the type described to a welding machine without removing the twist which is introduced to the wire by removal of the wire from the stationary container.

These and other objects and advantages of this invention will be apparent upon reference to the following description and claims taken in conjunction with the accompanying drawings wherein:

FIG. 1 is an isometric view of a welding machine having a fixed remotely disposed supply container of welding wire;

FIG. 2 is a fragmentary side elevational view of a welding machine having a wire guide unit constructed in accordance with the principles of the present invention mounted thereon;

FIG. 3 is a plan view of the apparatus shown in FIG. 2;

FIG. 4 is an enlarged fragmentary view of the guide unit shown in FIGS. 2 and 3 taken on the line 4—4 of FIG. 2;

FIG. 5 is a sectional view taken on the line 5—5 of FIG. 6 and showing a modified form of guide member for use in the welding system of this invention; and FIG. 6 is a sectional view taken on the line 6—6 of FIG. 5.

Referring now to the drawings in detail, the reference numeral 10 indicates, generally, a welding machine of the type having a welding hand piece, or gun, 11. An electrode in the form of welding wire 12 is fed through the welding machine to gun 11 through an insulated flexible conduit not shown. Other similar conduits (not shown) may carry water to and from the gun to cool it, inert gas to the gun to serve as welding flux, and control wires by which the welding machine can be controlled by switches located on the gun. The welding machine art is in itself highly developed. The machine shown here is merely a simplified diagrammatic representation of any one of a number of commercially available welding machines. It is mounted on the horizontal beam 13 of a floor stand 14 for swinging movement in a horizontal plane about the vertical axis of floor stand post 15. Thus, the welding machine may be swung about between a number of welding stations.

As may be seen in FIGS. 2 and 3, the welding machine includes a pair of welding wire feed rolls 16 and 18 driven through a right angle gearbox 19 from a synchronous motor 20. These rolls 16 and 18 rotate together to feed the welding electrode wire 12 from right to left as the apparatus is seen in FIGS. 1, 2 and 3. Two sets of straightening rollers as shown at 21 and 22 are provided on some welding machines to straighten the welding wire thereby making it easier for feed rolls 16 and 18 to push the wire through the flexible conduit to gun 11.

At some relatively remote location, supply container 24 of welding wire (FIG. 1) is disposed. It is preferable for the container 24 to be located as close to the welding machine as practical. In any event, it is remote in comparison to the beam 13 of floor stand 14 which is where a spool of welding wire is usually mounted. The exact location of the container is dictated by the work area in which the welding machine is used. The container is preferably located just off an aisle whereby full containers may readily be deposited by a forklift truck or the like. Their great weight, when full, prohibits manual handling. Container 24 has a vertical cylindrical perimeter 25, an open top 26, a solid horizontal planar bottom (not visible) and a vertical cylindrical central core member 28 standing perpendicularly from the bottom of the container. As may be seen in FIG. 1, this provides a vertically extending annular space 29 within the container which is packed with welding wire pre-formed into loops of equal size in the specific manner described above and in U.S. Patent No. 3,000,493 by the welding wire manufacturer.

The core member 28 of container 24 has a generally flat disc-like top 30. A stud 31 extends upwardly through the center of top 30 which is also the central vertical axis of the container in general. A nut (not visible) is threaded on stud 31 to lock the stud to the top 30. A washer 32 rests on top of the nut. A sleeve member 34 surrounds stud 31 and rests on washer 32 whereby the sleeve may rotate freely about stud 31. A horizontal arm 35 is welded to sleeve 34. A horizontal sleeve 36 is welded to the radially outward end of arm 35 and extends out over annular space 29. A first insulated guide member 38 is carried by horizontal sleeve 36. Each of the guide members of this invention are mounted in substantially the same mechanically simple manner which will be described more fully hereafter in connection with the other enlarged views. The function of first guide member 38 and arm 35 is to rotate about stud 31 when wire feed rolls 16 and 18 exert pull on welding wire 12 thereby lifting the welding wire loop by loop vertically out of container 24 over the top of central core member 28. The stud 31 protrudes above sleeve 34. A light coil spring bearing no reference numeral tests on top of sleeve 34 and surrounds stud 31. A washer and nut are received at 40 on stud 31 atop the coil spring. The purpose of the spring is to exert efficient drag on the sleeve member 34 to prevent arm 35 from spinning about stud 31 from inertia. The top washer and nut at 40 on stud 31 may be tightened or loosened to increase or decrease the breaking action of the spring on sleeve 34. It is not desirable to have any more drag on sleeve 34 and arm 35 than the minimum amount required to prevent overrunning of arm 35.

A vertical mast 41 is mounted rigidly on arm 35 adjacent sleeve 34. A second guide member 42 is mounted atop mast 41 and disposed substantially on the vertical central axis of container 24. A third guide member 44 is disposed above second guide member 42 and between the second guide member and the welding machine. Guide member 44 depends from a sleeve 45 which is loosely carried on a shaft 46, the axis of which points toward the welding machine. Shaft 46 is mounted on a post 48 which is attached to container 24.

Mounted on horizontal beam 13 of floor stand 14 is a wire guiding device indicated generally by the reference numeral 50. Guiding device 50 is best seen in FIGS. 2 and 3. The guiding device 50 has an adjustable support portion made up of a vertical bar 51 having a longitudinal slot 52 (FIG. 1) therein, a right angle bar 54, the horizontal leg of which has a longitudinal slot 55 (FIG. 3) therein, and a base bar 56. Nuts and bolts 58 (FIG. 2), extending through the slots 52 and 55, lock these support members into a rigid unit for operation while allowing the support to be adjusted to properly position the guide members relative to the optimum path of travel of the welding wire. Base bar 56 has a pintle 59 depending therefrom and journalled in a socket member 60 which is an integral part of beam 13. In the welding machine shown here, the socket 60 formally served to mount a conventional spool of welding wire.

A vertical sleeve 61 is welded to the top portion of vertical bar 51. A stud 62 is loosely received in sleeve 61 (FIG. 2). An angle plate 64 is rigidly carried atop stud 62. A washer 65 is disposed between the horizontal leg of angle plate 64 and the top of sleeve 61. Another washer 66 is received on the lower end of the stud 62 which protrudes below sleeve 61. A nut 68 on the bottom of stud 62 holds this assembly together while allowing stud 62 and angle plate 64 to rotate within sleeve 61. A horizontal stud 69 is rigidly carried by the vertical leg of angle plate 64. A sleeve 70 is journalled on stud 69, and a washer and nut 71 and 72 are received on the end of stud 69 protruding from sleeve 70.

Sleeve 70 rigidly carries downwardly diverging arms 74 and 75. Arms 74 and 75 rigidly carry horizontal sleeves 76 and 78, respectively, at their lower ends. A pair of studs 79 and 80 are, respectively, carried loosely in sleeves 76 and 78. The studs 79 and 80 rigidly carry, respectively, vertical sleeves 81 and 82. A pair of washers 84 and 85 and a pair of nuts 86 and 88 are provided on the ends of the studs 79 and 80 to complete these pivot assemblies. A pair of studs 89 and 90 extend through vertical sleeves 81 and 82, respectively. A washer and nut set collectively indicated by the reference numerals 91 and 92, respectively, are provided on each of the studs 89 and 90 protruding above vertical sleeves 81 and 82. Washers 94 and 95 surround the respective studs 89 and 90 at the lower ends of vertical sleeves 81 and 82. The vertical studs 89 and 90 rigidly carry small plates 96 and 98 at their respectively lower ends. Wire guides 99 and 100 of insulating material such as glass or hard rubber are attached to plates 96 and 98 by U-bolts 101 and nuts 102 (see FIG. 4).

In FIG. 1 it may be seen that a light coil spring 104 has one end hooked to guide device base plate 56 and the other end anchored on floor stand beam 13. Spring 104 holds guide device 50 directed toward the welding machine while allowing it to move as necessary to allow the welding wire in its spiral form to move through the guiding device when the welding gun and floor stand beam 13 are swung about post 15 to different welding stations.

The guides 38, 42, and 44 previously described, are identical to guides 99 and 100. They are fixedly attached to small plates in the same manner as guides 99 and 100. The plate carrying guide member 38 is carried by a stud (no numeral) in sleeve 36 in the same manner shown in FIG. 4 regarding guide 99. The small plate which carries guide 42 is welded to a sleeve 105 (FIG. 1) journalled atop the mast 41. The plate on which guide member 44 is mounted is fixed to an arm 106 depending from sleeve 45 which is journalled on shaft 46. Thus, the first three guides 38, 42 and 44 are freely movable in a plurality of directions relative to the shafts or members which carry their small mounting plates. The guides 99 and 100 on guiding device 50 are freely movable in any direction because of the plurality of right angularly disposed pivot members between these guides and the support beam 13 on the welding machine.

The modified guide member shown in FIGS. 5 and 6 is simply a grooved roller 110 made of rubber or other insulating material. Roller 110 is journalled on a nut-bolt axle member 111. The axle is carried by a yoke 112 having slotted end pieces 114 made of rubber or other insulating material. The yoke 112 is shown welded to a small arm 115 depending from a sleeve member 45' resembling the sleeve 45 in FIG. 1. The sleeve member 45' is journalled on a shaft 46' and held thereon by a nut 116. It will be apparent that the yoke 112 could just as readily be welded to the end of a stud as to the small arm 115. For example, the roller guide 110 could be substituted for eyelet guide 99 in FIG. 4 simply by affixing yoke 112 to the bottom end of stud 89 (FIG. 4) in place of the small mounting plate 96.

The rolling friction of guides of the type shown in FIGS. 5 and 6 is less than the sliding friction between the wire 12 and the internal passages P (FIG. 4) of the eyelet type guides; consequently, the roller guides would be preferable from the standpoint of performance. The eyelet guides, however, are considerably less expensive than rollers and have been found to perform quite satisfactorily under most conditions. Economically then, the eyelet guides are preferred. The roller type guide is definitely preferred in place of the particular eyelet guide 44 in FIG. 1 if it is necessary to move the welding wire around a sharp corner as in the case where the welding machine is lower than the supply container and the wire travels up to the third guide member and then sharply back down past the container.

The operation of the welding system of this invention is as follows: when wire feed rolls 16 and 18 are actuated, they propel the welding wire 12 linearly and longitudinally to the welding gun 11. The pull, or tension, they exert on the reach of wire between the welding machine and container 24 causes arm 35 to rotate about the container and lift the upper-most loop of welding wire out of the container rather than allowing it to draw tight about container core member 28. As stated before, the transformation of the welding wire from its preformed flat loop form in the container to a running length of wire introduces a three hundred sixty degree twist in the wire for each loop removed from the container. This results in the reach of wire between the container and the welding machine drawing up into an irregular spiral form. The wire is taut enough under the combined pull of the feed rolls and the tension created by the introduction of the twist that any further increase in wire tension will draw more wire from the container even though the wire is not drawn out into a straight reach between the container and the welding machine. Welding wire is stiff enough that unless this spiral, or twist, can be kept moving freely toward the welding machine, it will travel back the wire into the container and tangle the wire in the container by causing the upper-most loops therein to shift about in an effort to relieve the torsional stress in the wire. Each guide member 38, 42, 44, 100 and 99 is free to move and move in response to side pressure thereon from the spiral wire to allow the spiral to move through the guide members without the guide members creating sufficient drag on the wire to alter the existing spiral form of the wire and without causing the spiral to turn through a guide like a screw. Rather than to positively force the wire to travel in the right direction, these guides yieldably coax the wire in the proper direction.

With this system, the container need not be rotated to remove the twist from the welding wire; the twist travels through the guides.

While this invention has been described in connection with a particular embodiment thereof, it will be understood that it is capable of modification. For example, it will be immediately apparent that a single ball-type joint would provide the universal movement afforded by two or more of the right angle pivot assemblies of the guide device 50. Other similar modifications will be readily apparent to those skilled in the art and this application is intended to cover any variations, uses or adaptations following, in general the principles of the invention and including such departures from the present disclosure as come within known or customary practice in the art to which the invention pertains, and as fall within the scope of the invention or the limits of the appended claims.

Having thus described my invention, what I claim is:

1. In electric welding equipment of the type utilizing an advancing welding wire electrode the combination comprising, a stationary container, a supply of welding electrode wire in said container in the form of a single continuous strand pre-formed into a multitude of flat loops of equal size, a welding machine disposed remotely from said container and selectively intermittently operable to consume welding electrode wire in the performance of welding operations, power operated wire feeding means on said welding machine operable to feed said welding wire longitudinally and linearly into said welding machine in synchronism with operation of the welding machine, a reach of said wire extending from said container to said wire feeding means and being operatively engaged by the feeding means, said reach of wire having an irregular generally spiral form resulting from the transformation of said wire from its flat loop form in said container to a longitudinally extending linear form at said feeding means, a plurality of wire guide members disposed along said reach, each of said guide members having a passage therethrough through which said reach of wire passes in extending from within said container to said wire feeding means, and means mounting each of said guide members for limited free bodily movement in a plurality of directions in response to pressure thereon from said wire in directions other than the direction of extent of said passage whereby while guiding said reach of wire said guide members are free to move and follow said irregular spiral form of the wire.

2. In electric welding equipment of the type utilizing an advancing welding wire electrode the combination comprising, a stationary container having a vertical cylindrical perimeter, a generally planar horizontal bottom, an open top and a centrally disposed cylindrical core member extending perpendicularly upwardly from said bottom and spaced radially inwardly from said perimeter to define a vertically extending annular space within said container between said core member and said cylindrical perimeter, a welding machine remote from said container and selectively operable to consume welding electrode wire in the performance of welding operations, power operated wire feeding means on said welding machine operable to feed wire linearly and longitudinally into said welding machine in synchronism with operation of the welding machine, a supply of welding electrode wire in the form of a single unbroken strand disposed in said annular space in said container, said strand of wire being pre-formed into a multitude of flat loops of equal diameter, said loops being stacked flatly in said container one atop another from the bottom of the container to the top with each loop loosely and eccentrically encircling said core member and each loop being circumferentially displaced in said container relative to the immediately underlying loop whereby said vertically extending annular space in the container is initially substantially filled by said single strand of welding electrode wire and said container is adapted to be emptied by elevating the loops of wire over the top of said core member one loop at a time working from the top of the container downwardly to the bottom thereof, said strand of wire having a reach extending out through the open top of said container to said remotely disposed wire feeding means and being operatively engaged thereby, said reach of wire having an irregular generally spiral form resulting from the transformation of said wire from its flat loop form in said container to a longitudinally extending linear form at said feeding means, a plurality of wire guide members disposed along said reach of wire and each having a passage therethrough through which said reach of wire extends, and means mounting each of said guide members for free bodily movement in a plurality of directions independently of each of the other guide members to allow free movement through the guides of the irregular generally spiral form of said reach.

3. In electric welding equipment of the type utilizing an advancing welding wire electrode the combination comprising, a stationary vertical cylindrical container having a centrally disposed vertical core member, a supply of welding electrode wire in the form of a single continuous strand pre-formed into a multitude of equal size flat loops lying one atop another in said container and each loosely encircling said core member, a welding machine disposed remotely from said container and selectively intermittently operable to consume welding electrode wire in the performance of welding operations, power operated wire feeding means on said welding machine operable to feed wire longitudinally and linearly into said welding machine in synchronism with operation of the welding machine, an arm journalled on the top of said container central core member for rotation in a horizontal plane, a first wire guide member mounted on said arm for free pivotal movement relative thereto about a horizontal axis, a vertical mast mounted on said arm and extending upwardly therefrom, a second wire guide member mounted on said mast at the top thereof for free pivotal movement relative thereto about a vertical axis, a third guide member supported above said second guide member and between said second guide member and said wire feeding means, said third guide member being mounted for free pivotal movement about an axis extending toward said wire feeding means, a reach of said pre-formed welding wire extending out of said container and through said first, second and third guide members respectively and then to said wire feeding means and being operatively engaged by the wire feeding means, said reach of wire having an irregular generally spiral form resulting from the transformation of said wire from its flat loop form in said container to a longitudinally extending linear form at said feeding means, operation of said wire feeding means serving to draw said wire through said guide member and effect rotation of said arm about said container core member thereby lifting said wire out of said container over said core member loop by loop, said guide members pivoting freely in response to side pressures exerted thereon by the irregular spiral form of said reach of wire thereby avoiding drag on said wire and deformation of the irregular spiral form of said reach of wire thus avoiding wire feeding surges and backlashes of a magnitude sufficient to prevent successful wire feeding.

4. An electric welding equipment combination as recited in claim 3 wherein at least one of said guide members comprises an eyelet formed of electrically non-conductive material, a support plate for said eyelet, means fixedly mounting said eyelet on said support plate, and means mounting said support plate for pivotal movement about at least one axis.

5. An electric welding equipment combination as recited in claim 3 wherein at least one of said guide members comprises a circumferentially grooved roller formed of electrically non-conductive material, an axle member extending through said roller, a support member carrying said axle member, and means mounting said support member for pivotal movement about at least one axis.

6. In electric welding equipment of the type utilizing an advancing welding wire electrode the combination comprising, a welding machine mounted for pivotal movement between a plurality of spaced apart welding stations and being selectively intermittently operable to consume welding electrode wire in the performance of welding operations at said plurality of stations, power operated wire feeding means on said welding machine operable to feed welding electrode wire longitudinally and linearly into said welding machine in synchronism with operation of the welding machine, a stationary vertical cylindrical container disposed in a fixed location remote from said welding machine, said container having a vertical cylindrical core member therein of substantially smaller diameter than said container thereby providing a vertically extending annular space in said container, a supply of welding electrode wire occupying said space in said container, said wire being pre-formed into a multitude of flat loops of equal size stacked loosely one atop another in said container from the bottom thereof to the top and each loop encircling said core member, said welding wire having a reach extending from said container to said wire feeding means and being operatively engaged by said feeding means, said reach of wire having an irregular generally spiral form resulting from the transformation of the wire from its flat loop form in said container to a longitudinally extending linear form at said feeding means, means for lifting said welding wire out of said container upon operation of said wire feeding means and directing said reach of wire toward said welding machine, said wire lifting and directing means comprising an arm journalled on the top of said container core member for rotation in a horizontal plane, a first wire guide member mounted on said arm for free pivotal movement relative thereto about a horizontal axis, a vertical mast mounted on said arm and extending upwardly therefrom, a second wire guide member mounted on said mast at the top thereof for free pivotal movement relative thereto about a vertical axis, a third guide member supported above said second guide member and between said second guide member and said wire feeding means, said third guide member being mounted for free pivotal movement about an axis extending toward said wire feeding means, said reach of welding wire extending out of said container and through said first, second and third guide members respectively and then to said wire feeding means, operation of said wire feeding means serving to draw said wire through said guide members and effect rotation of said arm about said container core member thereby lifting said wire out of said container over said core member loop by loop, and a wire guide device disposed along said reach of wire between said third guide member and said wire feeding means to guide said reach of wire to said wire feeding means during pivotal movement of said welding machine between said plurality of welding stations, said wire guide device comprising a pair of wire guide members spaced apart along said reach of wire, a support for said guide members, means mounting each of said guide members on said support for pivotal movement relative thereto independently of the other of said guide members, and pivot means mounting said support in a fixed position relative to said welding machine, said guide members pivoting freely in response to side pressures exerted thereon by the irregular spiral form of said reach of wire thereby avoiding drag on said wire and deformation of the natural irregular spiral form of said reach which would otherwise produce surges and backlashes in said wire during feeding and tangle the wire.

References Cited in the file of this patent
UNITED STATES PATENTS 3,119,042     Marshall _____ Jan. 21, 1964

FOREIGN PATENTS 218,467     Australia _____ Nov. 13, 1958
607,629     Canada _____ Oct. 25, 1960